United States Patent Office

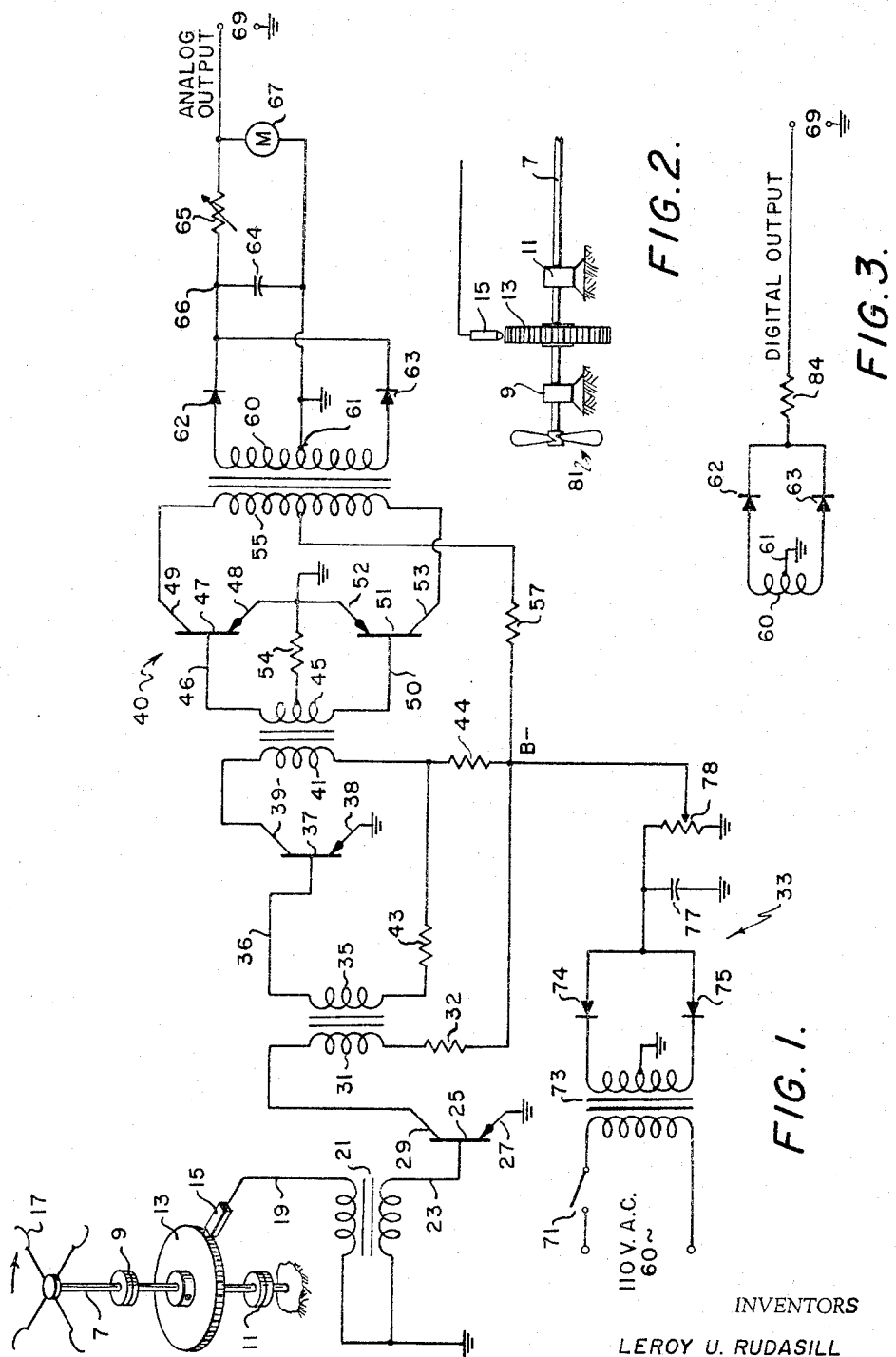

3,276,256
Patented Oct. 4, 1966

3,276,256
WIND INDICATING SYSTEM
Le Roy U. Rudasill, Prince Georges County, and Marvin Reich, Montgomery County, Md., assignors to the United States of America as represented by the Secretary of the Navy
Filed Sept. 19, 1963, Ser. No. 310,178
12 Claims. (Cl. 73—188)

The invention described herein may be manufactured and used by or for the Government of the United States of America for governmental purposes without the payment of any royalties thereon or therefor.

This invention relates to wind indicating systems and more particularly relates to a system for providing a digital signal for indicating the velocity and the direction of the wind.

Various devices for measuring the velocity and direction of wind have been developed in the prior art and generally operate satisfactorily. However, it has been found desirable to have the velocity and direction measuring devices capable of supplying a digital output. Most of the prior art devices require the use of an analog to digital converter for converting their analog output into digital form. From a military point of view this approach has several inherent disadvantages, such as an increase in the weight of the equipment required, an increase in the amount of power required to operate the devices, an increase in the amount of space required to house the analog to digital converter, and in addition a decrease in reliability since an additional component is required which is capable of failure under the adverse conditions met in military applications.

In accordance with the invention, the wind velocity indicating device comprises a set of anemometer cups responsive to the wind for turning a pulse producing means. The pulses are amplified and rectified before being supplies to a digital computer for use in the ships navigation and control systems. If desired, an analog indication can be obtained for the system by using an integrating device to sum the output pulses. The wind direction is obtained by the use of a wind vane or pointer for rotating a pulse producing means. The pulses are phase displaced to indicate the direction of rotation of the wind vane. The pulses are either added or subtracted from each other depending on the direction of rotation of the wind vane. Thusly, the total count at any given time is indicative of the compass heading of the wind.

An object of this invention is to provide a device of the type described that can have as an output pulses suitable for use in a digital data processing device.

Another object of this invention is to provide a device of the type described that is completely electronic and automatic in operation.

A further object of this invention is to provide a device of the type described that is capable of giving a continuous and instantaneous readout.

Still another object of this invention is to provide a device which utilizes no electrical contacts or other movable device which corrodes and wears out with age.

Still another object of this invention is to provide a device which utilizes no electronic oscillators or other complex circuitry which can drift and vary as the equipment ages.

Other objects and many of the intendant advantages of this invention will be readily appreciated as the same become better understood by reference to the following detailed description when considered in connection with the accompanying drawings in which like reference numerals designate like parts throughout the figures thereof and wherein:

FIG. 1 is a schematic diagram showing one embodiment of the invention;

FIG. 2 is a plain view of an alternate wind velocity sensing device useable in the instant invention;

FIG. 3 is a schematic diagram of a digital output circuit useable in the instant invention.

Figure 4:
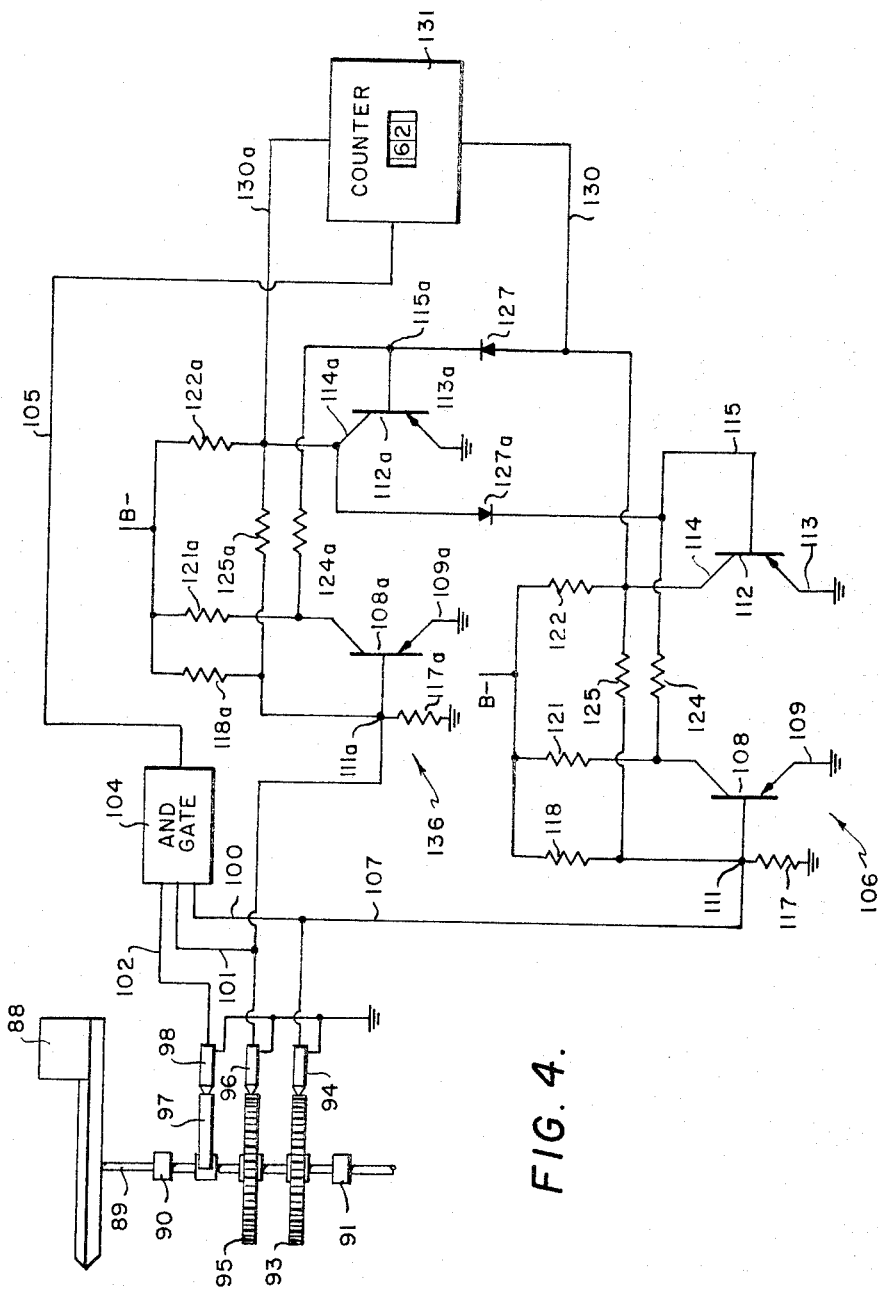
FIG. 4 is a schematic diagram of a wind direction indicating device embodying the instant invention.

Referring to FIG. 1, a rod 7 has a first bearing 9 mounted thereon and a second bearing 11 is mounted on the rod 7 at a predetermined distance from bearing 9. A pulse producing means 13, comprising a gear having ferro magnetic material teeth thereon, is mounted on the shaft 7 between bearings 9 and 11. A pick-up 15 comprising a magnetic detector is mounted adjacent the pulse producing means 13 for indicating each tooth as it passes by the pick-up. Anemometer 17 is mounted at one end of shaft 7 and causes shaft 17 to rotate with an angular velocity which is proportional to the velocity of the wind. The output of pick-up 15 is connected by wire 19 to one end of the primary winding of transformer 21 with the other end of the primary winding of transformer 21 connected to ground. The output winding of transformer 21 has one terminal connected to the ground and the other terminal of the output winding of the transformer 21 is connected to the base electrode 23 of transistor 25. The emitter electrode 27 of transistor 25 is connected to ground. The collector electrode 29 of transistor 25 is connected to primary winding 31 of transformer $t$–2. The other terminal of primary winding 31 is connected through a resistor 32 to a source 33 of negative potential, B-minus. The secondary winding 35 of transformer $t$–2 has one end connected to the base electrode 36 of transistor 37. The emitter electrode 38 of transistor 37 is connected to ground. The collector electrode 39 of transistor 37 is connected to primary winding 41 of transformer $t$–3. The other end of the primary winding 41 of transformer $t$–3 is connected through a resistor 43 to the other end of secondary winding 35 of transformer $t$–2. A resistor 44 is connected between the junction of resistor 43 and the primary winding 41 and source 33 of the negative potential, B-minus. The secondary winding 45 of transformer $t$–3 has one end connected to the base electrode 46 of transistor 47. The emitter electrode 48 of transistor 47 is connected directly to ground. The collector electrode 49 of transistor 47 is connected to one end of primary winding 55 of transformer $t$–4. The other end of primary winding 45 of transformer $t$–3 is connected to the base electrode 50 of transistor 51. The emitter electrode 52 of transistor 51 is connected directly to ground. The collector electrode 53 of the transistor 51 is connected to the other end of the primary winding 55 of transformer $t$–4. A resistor 54 has one end connected directly to ground and its other end connected to the midpoint of secondary winding 45 of transformer $t$–3. Thusly, transistors 47 and 51 are operating as a push-pull amplifier. A resistor 57 has one end connected to a source of negative potential 33 with the other end connected to the center point of secondary winding 55 of transformer $t$–4.

The secondary winding 60 of transformers $t$–4 has its center point center tapped to ground at point 61. One end of winding 60 is connected to the anode of diode 62 and the other end of winding 60 is connected to the anode of diode 63. The cathodes of diodes 62 and 63 are connected together. A capacitor 64 has one end connected to the junction point of the cathode of diodes 62 and 63 and the other end connected to ground. The output of the circuit is taken across terminal 69 which has a resistor 65 connected in series with the point 66 being the junction point of diode 62, diode 63 and capacitor 64. A volt meter 67 for indicating the output voltage is connected across the output terminals 69.

The B-minus power supply 33 consists of a switch 71 which when closed feeds the primary winding of transformer 73. The output winding of transformer 73 is center tapped to ground with one end of the secondary winding connected to the cathode of diode 74, the other end of the secondary winding of transformer 73 is connected to the cathode of diode 75. The anodes of diodes 74 and 75 are connected to one terminal of smoothing capacitor 77. The other terminal of smoothing capacitor 77 is connected directly to ground. A variable center tapped potentiometer 78 is connected across smoothing capacitor 77 with the output of the power supply taken from the movable tap.

It is to be noted that FIGS. 2 and 3 are modifications of FIG. 1. Instead of anemometer 17 driving rod 7, FIG. 2 utilizes a propeller 81 to drive rod 7. In FIG. 3 the smoothing capacitor 64 is eliminated from the anodes of diodes 62 and 63. Thusly, the output which appears across terminals 69 is in the form of digital pulses. The frequency or rather the number of pulses produced per unit of time is directly proportional to the velocity of the wind.

FIG. 4 discloses a wind directional unit comprising a wind vane 88 mounted on a shaft 89 which rides on bearings 90 and 91. Pulse generating means 93 is mounted on the rotating shaft 89 adjacent to a pulse pick-up 94. A pulse generating means 95 is mounted on shaft 89 with its teeth slightly phase displaced with reference to the teeth on pulse generating means 93 for reasons appearing below. A pulse detecting means 96 is provided opposite the pulse generating means 95. The shaft 89 is further provided with a keying means 97 which generates one pulse per revolution, which is detected by pulse detector 98. A lead 100 connects pulse detector 94 with an "and" gate 104. A second lead 101 connects pulse detector 96 to "and" gate 104 and a third lead 102 connects detector 98 with the "and" gate 104. The "and" gate 104 is provided with output lead 105 which is connected to counter 131, for giving an indication of coincidence of pulses being detected by pulse detectors 94, 96 and 98. A first flip-flop 106 is provided with a lead 107 to connect the input of the flip-flop with the pulse detecting means 94. The flip-flop 106 comprises a first transistor 108 having a grounded emitter electrode 109, a base electrode 111, a collector electrode 110, and a second transistor 112 having an emitter electrode 113, a collector electrode 114 and a base electrode 115. The base electrode 115 of transistor 112 is coupled to the collector electrode 110 of transistor 108 through a resistor 124. The base electrode 111 of transistor 108 is connected through resistor 125 to the collector electrode 114 of transistor 112. The base electrode 111 of transistor 108 is provided with a biasing network consisting of resistors 117 and 118 connected in series with the B-minus power supply. The value of the resistances 117 and 118 is so adjusted so as to make transistor 108 normally conductive. A biasing resistor 121 is connected between B-minus and the collector electrode 110 of transistor 108. A biasing resistor 122 is connected between B-minus power supply and the collector electrode 114 of transistor 112. The output of the circuit is taken from leads 130 and lead 130a which feeds counter 131. A second flip-flop 136 is identically constructed having the same components with the subscript, a, thereafter. A diode 127 is coupled from the output of collector electrode 114 of transistor 112 to the base of transistor 112a. It is to be understood that a transistor is one form of an electronic valve.

The operation of the wind direction indicator is such that as the wind changes direction, vane 88 causing pulse generators 93 and 95 to generate pulses to be detected by units 94 and 96. Assuming now that the pulse generating means 93 and 95 each generate 72 pulses per revolution and that pulse means 95 is phase displaced one degree in respect to pulse generating means 93 so that if the wind rotates the rod 89 in one direction 96 will detect the first pulse. However, if the wind rotates rod 89 in the opposite direction the pulse detector 94 will detect the first pulse. Assuming that the first pulse apears on the pulse detector 94, a positive pulse will be supplied to the base electrode 111 of transistor 108 and will tend to extinguish its conduction. Thereby, through regenerative action transistor 112 becomes conductive. Transistor 108 remains nonconductive as long as the positive pulse is on its base electrode. Diode 127 latches the base electrode 115a of transistors 112 to ground. This is so because collector electrode 114 is substantially at ground potential when transistor 112 is in its heavily conductive state. Therefore, when a positive pulse arrives at the base electrode 111a of transistor 108a it tends to make transistor 108a nonconductive. However, transistor 112a cannot become conductive because its base electrode is locked at ground potential. Therefore, a pulse does not appear on the output lead 130a. Assuming now that a pulse appearing at 130 represents the clockwise direction and the counter 131 will add one for every pulse and the counter will subtract one for every pulse appearing at output 130a indicating the counter clocking direction.

The output of the "and" gate 105 is connected to the input of the counter 131 to cause the counter to register zero. This establishes a reference point for the system which corrects itself every time the wind causes the vane to pass through its keying position.

The flip-flops 106 and 136 are interconnected by diodes 127 and 127a to form a phase detection circuit which will have an output on leads 130 or 130a depending on whether a positive pulse arrives first at the input of transistor 108 or 108a. It is emphasized that the circuit will have only one output at 130 or 130a at a given time and there is no interaction between the terminals 130 and 130a. Therefore, the phase detector of the instant invention will find utility wherever it is desired to have a phase detector circuit capable of indicating the angular diversion of a rotating shaft.

The circuit and apparatus of FIG. 1 operates thusly, a wind rotates anemometer 17 proportionally to the velocity of the wind thereby driving a pulse producing means 13 induces pulses into magnetic pick-up 15. These pulses are transmitted through transformer 21 to the base of electrode 23 of transistor 25. The transistor 25 is a grounded emitter amplifier which detects and amplifies the pulses appearing at its base. The pulses are further amplified in transistor 37 and in the push pull amplifier stage transistors 47 and 51. The output of transistors 47 and 51 is supplied through transformer $t$–4 to a pair of detector diodes 62 and 63 which detect each pulse. A smoothing capacity 64 is provided for integrating the pulses which are rectified by the detector diodes 62 and 63 and an output analog voltage is read by voltmeter 67 between the output terminal and ground. The output may be taken across terminal 69 to any analog computing device. The analog voltage thusly generated is proportional to the velocity of the wind. The voltmeter can be directly calibrated in miles per hour if desired.

If it is found desirable to feed the output pulses of the system to the input of a digital computer, the modification shown in FIG. 3 may be utilized wherein the output of transformer $t$–4 is coupled to a pair of rectifying diodes 62 and 63 which rectify the pulses supplied by transformer $t$–4. The resistor 84 limits somewhat the amplitude of the detected pulses which appear across terminals 69. The digital output of this circuit is proportional to the speed of rotation of the anemometer and therefore directly proportioned to the wind velocity.

Figure 5:
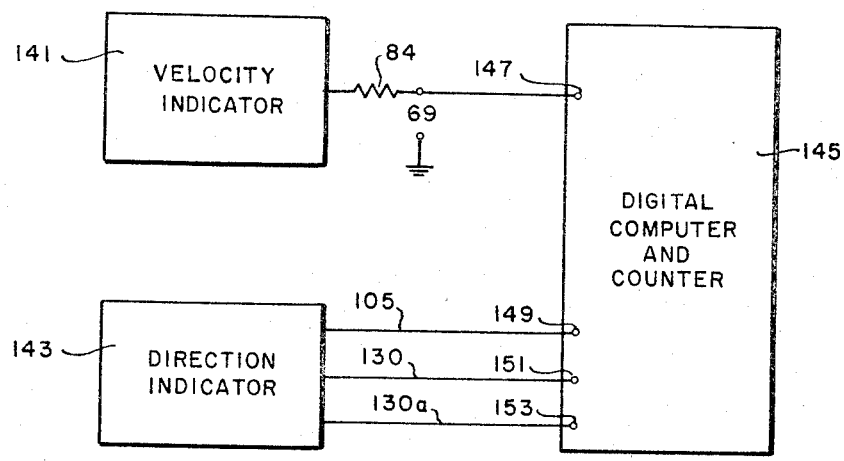
FIG. 5 is a block diagram of a digital computer system embodying the instant invention.

As is well know, it is essential to use wind direction and velocity in solving fire control or ballistic problems. To this end the modification illustrated in FIG. 5 utilizes a velocity indicator 141 and direction indicator 143 for driving a digital computer 145. Specifically, the output resistor 84 of FIG. 3 is connected to a first input terminal 147 of digital computer 145. Output leads 105, 130 and 130a of FIG. 5 are respectively connected to input terminals 149, 151 and 153 of the digital computer. The digital computer 145 performs the function of the counter shown in FIG. 4 as well as controlling a ship's navigational and fire control systems.

Obviously, many modifications and variations of the present invention are possible in the light of the above teachings. It is, therefore, to be understood that within the scope of the appended claims the invention may be practiced otherwise than as specifically described.

What is claimed is:

1. An apparatus for indicating the direction of the wind comprising:
   a shaft;
   means responsive to the wind for indicating the direction of the wind connected to said shaft;
   a first pulse producing means for producing a series of pulses connected to said shaft;
   a second pulse producing means for producing pulses which are phase displaced relatively to said first series of pulses connected to said shafts,
   a first monostable multivibrator having its input coupled to said first pulse producing means;
   a second monostable multivibrator having its input coupled to said second pulse producing means;
   said first and second monostable multivibrator having a respective second input terminal and having respective output terminals;
   means responsive to the output of said first monostable multivibrator for latching the second input of the second multivibrator to the potential level of the output of said first monostable multivibrator;
   means responsive to the output of said second monostable multivibrator for latching the second input of said first monostable multivibrator to the potential of the output of said second monostable multivibrator;
   a counting means connected to said first and second monostable multivibrators;
   whereby an output pulse on said first multivibrator causes the counter to add one number on the indicating face, and an output pulse on said second multivibrator causes the counter to subtract one number, the total number on the counter indicating the compass heading of the wind.

2. An apparatus for indicating the direction of the wind comprising:
   means for producing a first series of pulses in a first channel which are responsive to the direction of the wind;
   means for producing a second series of wind direction responsive pulses which are phase displaced relatively to said first series of pulses in a second channel;
   a first and second monostable multivibrators each having a first and second input terminals and one output terminal;
   said first pulse producing means being connected to the first input terminal of said first monostable multivibrator;
   said second pulse producing means being connected to the first input terminal of said second monostable multivibrator, and
   a first and second diodes each having a first and second terminal, said first diode having one end connected to the output terminal of said first monostable multivibrator and its other end connected to the second input terminal of said second monostable multivibrator, said second diode having one end connected to the output terminal of said second monostable multivibrator and its other end connected to the second input terminal of said first monostable multivibrator;
   whereby an output pulse can appear on only one of the monostable multivibrators at a given time thereby indicating the direction of the wind.

3. An apparatus for indicating the direction of the wind as defined in claim 2 but further characterized by said first and second monostable multivibrators each comprising a pair of cross coupled electronic valves having an input and output electrode;
   said first electronic valves being in their normally conductive state and said second electronic valves being in their normally nonconductive state;
   said first monostable multivibrator input being connected to the input electrode of said first electronic valve, said second monostable multivibrator input being connected to the input electrode of said second electronic valve; and
   said output of said first and second monostable multivibrator are taken from the output electrode of said second electronic valve.

4. An apparatus for indicating the direction of the wind is defined in claim 3 but further characterized by said diodes being polarized in the direction of easy current flow from the output electrode of said second electronic valve of one monostable multivibrator to the input electrode of the second electronic valve of the other monostable multivibrator when the second electronic valve is in its conductive state.

5. An apparatus for indicating the direction of the wind as defined in claim 4 but further characterized by having a counter having a plurality of inputs;
   said counter having one of its inputs connected to the output of said first monostable multivibrator for adding the output pulses to the number of pulses appearing on its face;
   said counter having a second one of its inputs connected to the output of said second monostable multivibrator for subtracting the output pulse from the number of pulses appearing on its face;
   whereby the number appearing on the face of the counter is indicative of the direction of the wind.

6. An apparatus for indicating the direction of the wind as defined in claim 5 but further characterized by having a keying means for indicating a predetermined zero position of the direction of the wind, and the output of the keying means being connected to another input of said counter for assuring that the counter returns to zero every time the keying point is passed.

7. An apparatus for indicating the direction of the wind as defined in claim 3 but further characterized by having a counter, having a plurality of inputs;
   said counter having one of its inputs connected to the output of said first monostable multivibrator for adding the output pulses to the number of pulses appearing on its face, said counter having a second one of its inputs connected to the output of said second monostable multivibrator for subtracting the output pulse from the number of pulses appearing on its face;
   whereby the number appearing on the face of the counter is indicative of the direction of the wind.

8. An apparatus for indicating the direction of the wind as defined in claim 7 but further characterized by haivng a keying means for indicating a predetermined zero position of the direction of the wind; and
   the output of the keying means being connected to another input of said counter for assuring that the counter returns to zero every time the keying point is passed.

9. Apparatus for indicating the phase relationship of pulses occurring in a plurality of channels comprising:
   a first and second monostable multivibrator having a respective first input terminal a second input terminal and an output terminal;
   means connecting the first input terminal of said first monostable multivibrator to a first one of the channels of the plurality of channels;

means connecting the first input terminal of said second monostable multivibrator to a second channel of the plurality of channels;

means permitting only one of said monostable multivibrators to have an output pulse at a given time, said last named means interconnecting said first and second monostable multivibrators so that a pulse appearing on the output of said first monostable multivibrator indicates that a pulse arrived on its first input terminal before a pulse arrived on the first input terminal of said second monostable multivibrator.

10. Apparatus for indicating the direction of rotation of a shaft comprising:

means responsive to the rotation of a shaft for producing a first series of pulses in a first channel and a second series of pulses in a second channel, said pulses in one channel being phase displaced relative to said pulses in said second channel;

so that the pulse in the first channel will appear first in time when the shaft rotates in a clockwise direction and the pulse in the second channel will appear first in time when the shaft rotates in counter clockwise direction;

a first and second monostable multivibrator each having a first input terminal and an output terminal;

said first input of said first monostable multivibrator being connected to said first pulse producing means;

said first input of said second conostable multivibrator being connected to said second pulse producing means;

means interconnecting said first and second monostable multivibrator to assure that an output pulse appears on only one of the multivibrators at any given time;

whereby a pulse appearing on the output terminal of said first monostable multivibrator indicates a predetermined rotation in the clockwise direction and a pulse appearing on the output terminal of said second monostable multivibrator indicates a predetermined rotation in the counterclockwise direction.

11. Apparatus for indicating the direction of rotation of a shaft as defined in claim 10 wherein said first and second monostable multivibrator respectively comprises:

a first and second PNP transistors each having a base electrode, emitter electrode and a collector electrode;

said respective emitter electrodes being connected to ground, said base electrodes of said respective first transistor coupled to the respective collector electrodes of said second transistors, and said respective base electrodes of said second transistors coupled to the respective collector electrodes of said first transistor;

said first input terminals of said monostable multivibrators being the base electrode of said first transistors;

biasing means connected to the respective base of electrodes of said first transistors for making said first transistors normally conductive;

whereby the input pulses extinguish the conductive state of said first transistor;

said means interconnecting said first and second monostable multivibrators being a first and second diode;

each diode having an anode electrode and a cathode electrode;

the anode electrode of said first diode being connected to the collector electrode of said second transistor in said first monostable multivibrator, and said cathode electrode of said first diode being connected to said base electrode of said second transistor of said second monostable multivibrator;

said anode electrode of said second diode being connected to the collector electrode of said second transistor in said second monostable multivibrator, and said cathode electrode of said second diode being connected to said base electrode of said second transistor in said first monostable multivibrator;

the output terminals of said monostable multivibrators being the respective collector electrodes of said second transistors;

a counter having a first input for adding pulses to a number and a second input for substracting pulses from a number;

said output terminal of said first monostable multivibrator connected to said first input of said counter;

said output terminal of said monostable multivibrator connected to said second input of said counter;

whereby the number appearing on the face of the counter is indicative of the rotation of said shaft.

12. Apparatus for use in computing ballistic and fire control problems utilizing wind velocity and direction comprising:

a first shaft carrying a means responsive to the wind for indicating the direction of the wind;

a first pulse producing means for producing a series of pulses connected to said shaft, a second pulse producing means for producing pulse which are phase displaced relatively to said first series of pulses connected to said shaft;

a first monostable multivibrator having its input coupled to said first pulse producing means;

a second monostable multivibrator having its input coupled to said second pulse producing means;

said first and second monostable multivibrators having a respective second input terminal and output terminals;

means responsive to the output of said first monostable multivibrator for latching the second input of the second multivibrator to the potential level of the output of said first monostable multivibrator, and means responsive to the output of said second monostable multivibrator for latching the second input of said first monostable multivibrator to the potential of the output of said second monostable multivibrator;

a digital computer means connected to said first and second monostable multivibrators;

means for producing pulses which are respresentative of the velocity of the wind;

amplifier means having an input and an output, said amplifier means having its input coupled to said pulses producing means;

pulse detecting means having an input and an output means coupling said output of said amplifier means to the input of said pulse detecting means;

the output of said pulse detecting means being connected to said digital computer means;

whereby the digital computer utilizes the output pulses of said wind velocity indicating means and the output pulses of said wind direction indicating means for solving said fire control and ballistic problems and for maintaining a record of the wind velocity and direction.

References Cited by the Examiner

UNITED STATES PATENTS 2,270,141 1/1942 Potter _____ 73—231
3,156,115 11/1964 Adelmann _____ 73—232

FOREIGN PATENTS 123,110 12/1946 Australia.

OTHER REFERENCES

Basic Electronics: Bureau of Naval Personnel, pp. 49–52 of interest, 1962.

RICHARD C. QUEISSER, *Primary Examiner.*

J. JOSEPH SMITH, *Assistant Examiner.*